J. I. MOREHEAD.
INKSTAND.
APPLICATION FILED NOV. 20, 1911.

1,047,975.

Patented Dec. 24, 1912.

Witnesses
William C. Linton
Charles S. Wilson

Inventor
John I. Morehead.
By Wm C. W. Intire
Attorney

UNITED STATES PATENT OFFICE.

JOHN I. MOREHEAD, OF SMITH CENTER, KANSAS.

INKSTAND.

1,047,975.   Specification of Letters Patent.   Patented Dec. 24, 1912.

Application filed November 20, 1911. Serial No. 661,322.

*To all whom it may concern:*

Be it known that I, JOHN I. MOREHEAD, a citizen of the United States, residing at Smith Center, in the county of Smith and State of Kansas, have invented certain new and useful Improvements in Inkstands; and I do hereby declare the following to be a full, clear, and exact description of the invention, such as will enable others skilled in the art to which it appertains to make and use the same.

This invention relates to ink wells and has for its object to provide a means whereby the supply of ink is kept from all contact with the air, thus eliminating evaporation and waste.

A further object of this invention is to provide a means whereby the ink well may readily be cleaned from all sediment and the like, and further to provide a means whereby the feed of the ink will be of such construction that a gradual but constant flow of ink will be provided.

Figure 1:
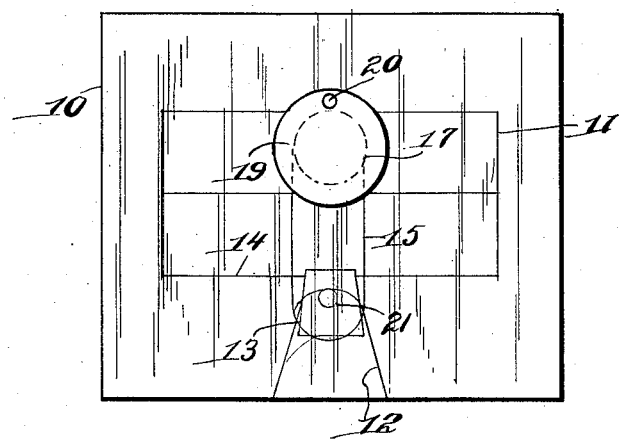
Figure 2:
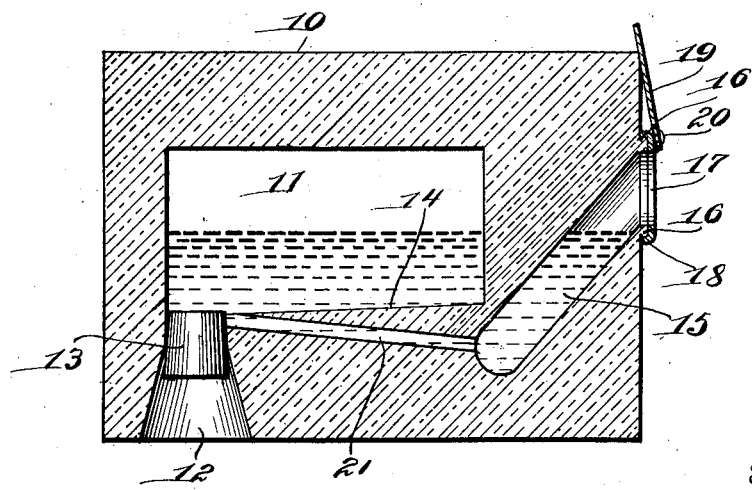

With the above and other objects in view, this invention consists in the construction, combination and arrangement of parts, all as hereinafter more particularly described, claimed and illustrated in the accompanying drawings, wherein:

Figure 1 is a front elevation of an ink well constructed in accordance with the present invention; Fig. 2 is a central, longitudinal section thereof.

The ink well forming the subject matter of the present invention comprises a rectangular or other suitably shaped block of glass or other transparent material having located therein a rectangular reservoir which is connected with the exterior atmosphere by the opening piercing said block adjacent to one terminal of the rectangular reservoir. The base of said reservoir slopes slightly toward said opening, in order that when it is desired to cleanse the ink well the operation may readily be perfected. An obliquely arranged well is arranged at one terminal of the ink well and is connected to the reservoir by the longitudinal passage which extends from adjacent the connection between the reservoir and the exterior atmosphere to the lower terminal of the well. A suitable lid is provided to the well and the operation of the device will be clearly understood from the following description.

Referring more particularly to the drawings, 10 indicates the block of glass or other transparent material of any suitable size or shape, having located therein a rectangular or other suitably shaped reservoir 11. The rear terminal of this reservoir is connected to the exterior atmosphere by an inwardly tapered passage 12, which, when the ink well is being filled, constitutes a funnel and is adapted to be closed by rubber or other suitable cork 13 placed therein. The opening 12 is located in the bottom of the block 10, and, therefore, when it is desired to fill the ink well, the block is inverted and the cork 13 removed, thus permitting the ink to be poured into the reservoir 13 through the passage 12. The bottom 14 of the reservoir slopes from the front end of the block 10 to the opening 12. Thus, when the cork is removed, it is impossible for all sediment and the like, which is located upon the bottom of the ink well, to drain through the opening 12 which would be impossible should the bottom 14 be level. Located in the block, at the opposite terminal thereof to the passage 12, is an obliquely arranged cylindrical well 15, which has its outer terminal surrounded by bead 16. A collar 17 engages this bead by the inwardly curved flange 18 and carries a lid 19 pivotally connected thereon, through the instrumentality of the pin 20. The lower terminal of the reservoir is connected by a longitudinal passage 21 with the reservoir 11, said passage extending from the lower terminal of the well 15 to the reservoir openings into the same adjacent to the opening 13. The terminal of the passage 21 coöperating with the well 15 is lower than the opposite terminal thereof. The utility of the lid is hereinafter more fully described.

It will clearly be understood that when it is desired to fill the ink well, the block 10 is inverted and the cork 13 removed. This makes the terminal of the passage 21 opening into the well 15 at a higher elevation than the opposite terminal thereof, and consequently as the ink is poured into the passage 12 and the reservoir 11, the same will in no way pass through the passage 21. After the ink well is filled, the cork is then replaced and the ink well is reverted, thus causing the ink to run through the passage 21 into the well 15 where access may be had thereto by pen after the closure 19 has been removed.

Having thus fully described my invention, what I claim as new, and desire to secure by U. S. Letters Patent, is:

In an ink well, a rectangular block provided with an internal rectangular reservoir and a conical aperture leading to the bottom thereof, terminating flush with one of the vertical walls of said reservoir, and provided with a downwardly inclined well leading from the opposite face of said block and terminating below the bottom of said reservoir, said block having an inclined passage connecting said well near its lower end with said reservoir adjacent to that side of the conical aperture opposite the adjacent wall of said reservoir.

In testimony whereof I affix my signature in presence of two witnesses.

JOHN I. MOREHEAD.

Witnesses:
J. M. DAVIS,
F. S. MUNSINGER.

Copies of this patent may be obtained for five cents each, by addressing the "Commissioner of Patents, Washington, D. C."